United States Patent Office 3,047,530
Patented July 31, 1962

3,047,530
REACTION PRODUCT OF AN ISOCYANATE-MODIFIED UNSATURATED POLYESTER WITH AN ETHYLENICALLY UNSATURATED MONOMER AND A POLYAMINO COMPOUND, AND PROCESS FOR PREPARING SAME
Gunther Nischk, Leverkusen, and Karl E. Müller, Leverkusen-Bayerwerk, Germany, assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware
No Drawing. Filed July 14, 1955, Ser. No. 545,102
(Filed under Rule 47(a) and 35 U.S.C. 116)
Claims priority, application Germany July 16, 1954
5 Claims. (Cl. 260—45.4)

This invention relates to novel cross-linked plastics and to a process for making the same.

It is well known to produce cross-linked plastics by copolymerizing unsaturated polyesters and vinyl compounds in the presence of free radical liberating catalysts such as peroxides and azo compounds, but the copolymers thus obtained have the disadvantage of being unstable to hot water. Thus, the bending strength of such a copolymer may drop to about 1/10 of the original value after soaking for 30 days in water at 90° C.

It is an object of the present invention to provide novel cross-linked plastics based on unsaturated polyesters and ethylenically unsaturated compounds. Another object is to provide cross-linked plastics which obviate the disadvantages of the known plastics based on unsaturated polyesters and ethylenically unsaturated compounds. A further object is to provide cross-linked plastics which exhibit excellent mechanical properties. A still further object is to provide a process for preparing the novel cross-linked plastics of the invention.

From the following description it will be apparent how the foregoing objects and related ends are achieved.

It has now been found that cross-linked plastics of outstanding properties can be obtained if an isocyanate-modified unsaturated polyester containing terminal isocyanate groups is reacted with an ethylenically unsaturated compound and a polyamine or polyamino alcohol in the presence of a polymerization catalyst.

The unsaturated polyesters useful in the practice of the invention are prepared in known manner by thermal condensation of unsaturated dicarboxylic acids or their anhydrides with polyhydric alcohols at temperatures within the range of 150 to 220° C., using such reaction conditions and proportions of reactants as to obtain unsaturated polyesters having an average molecular weight of 250 to 5,000, a hydroxyl number of 80 to 450 and an acid number of 0 to 40. In addition to unsaturated dicarboxylic acids and their anhydrides, saturated dicarboxylic acids and functional derivatives thereof may be used in the production of such unsaturated polyesters in order to vary the properties of the latter.

Representative examples of unsaturated dicarboxylic acids and derivatives thereof which are suitable for producing unsaturated polyesters include maleic acid, fumaric acid, and the anhydrides thereof. Among the unsaturated dicarboxylic acids which may be used along with unsaturated acids in the preparation of unsaturated polyesters are adipic acid, phthalic acid, and hexachloroendomethylene phthalic acid. Polyhydric alcohols which may be esterified with these dicarboxylic acids to form suitable unsaturated polyesters are ethylene glycol, propylene glycol, butylene glycol, hexanediol-1,6, hexanetriol, trimethylol propane, glycerine, butenediol, and butinediol-1,4.

The unsaturated polyesters thus produced are reacted with a polyisocyanate, preferably a diisocyanate, in an amount in excess of that required for their terminal hydroxyl and carboxyl groups and in the presence of a polymerization inhibitor, such as quinhydrone, quinone or anthraquinone. In this manner isocyanate-modified unsaturated polyesters containing terminal isocyanate groups are obtained. Depending upon the excess of polyisocyanate employed, either chain lengthening with formation of urethane groups occurs or—when using an excess of 100% of a diisocyanate—there is formed an addition product containing free terminal isocyanate groups in an unlengthened chain. The addition of polyisocyanates can be carried out at room temperature, the reaction temperature then rising up to 140° C., or the polyester may be preheated to about 80° C., whereafter cooling is necessary to avoid the temperature exceeding 140° C.

Both aliphatic and aromatic polyisocyanates are suitable for use in this reaction, illustrative examples being hexamethylene diisocyanate, the toluylene diisocyanates, the phenylene diisocyanates, and p,p'-diphenylmethane diisocyanate.

The isocyanate-modified unsaturated polyesters obtained in the above described manner are now reacted in the presence of a polymerization catalyst with ethylenically unsaturated compound and a polyamine or polyamino alcohol containing at least one hydrogen atom on each nitrogen atom at a temperature within the range of 80–140° C., preferably 90–120° C. In this reaction the isocyanate groups of the isocyanate-modified unsaturated polyester react first of all with the polyamine or polyamino alcohol to form a three dimensional cross-linked structure. Owing to the presence of a polymerization catalyst, a copolymerization of this cross-linked product with the ethylenically unsaturated compound is almost simultaneously initiated whereby a highly cross-linked plastic is formed. The ethylenically unsaturated compound is employed in a quantity of 10–50% calculated on the isocyanate-modified polyester used. The amount of polyamine or polyamino alcohol is dependent on the amount of free NCO-groups contained in the isocyanate-modified polyester. As polymerization catalyst any catalyst known in the art can be used which contains no active hydrogen atoms, thus e.g. benzoyl peroxide, cumol peroxide and azodiisobutyronitrile. By "cumol peroxide" is meant the peroxide prepared by the oxidation of cumene having the formula

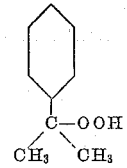

In carrying out the reaction between the isocyanate-modified unsaturated polyester, the ethylenically unsaturated compound, and the polyamine or polyamino alcohol, it is advantageous to prepare a solution of the isocyanate-modified polyester in the ethylenically unsaturated compound and to add the polyamine or polyamino alcohol and the polymerization catalyst thereto.

Ethylenically unsaturated compounds which may be reacted with the isocyanate-modified unsaturated polyesters in accordance with the invention include, inter alia, styrene, esters of acrylic, and methacrylic acid, the diallyl esters of phthalic acid and maleic acid and mixtures thereof. Polyamines which are particularly satisfactory are aromatic polyamines, such as 3,3'-dichlorobenzidine, 3,3'-dichloro-4,4'-diaminodiphenyl methane, 2,5-dichloro-1,4-phenylene diamine. Suitable polyamino alcohols include, for example, the reaction products of one or two mols of ethylene oxide with 1 mol of the above diamines. Examples of such polyamino alcohols are:

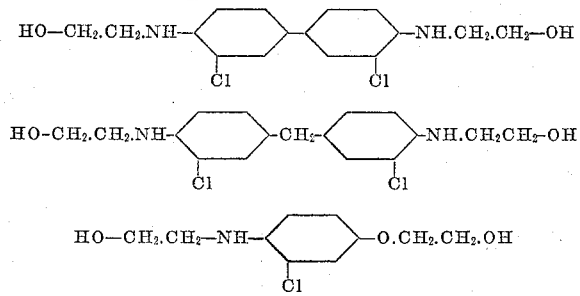

As polymerization catalysts there are used the conventional polymerization catalysts, i.e., compounds capable of forming free radicals, such as organic peroxides and azo compounds.

As distinguished from the known plastics derived from unsaturated polyesters, the highly cross-linked plastics of the instant invention are stable to hot water. In view of their outstanding resistance to chemicals and their excellent mechanical properties, they can be processed into many different types of articles for domestic and industrial use, thus for instance for refrigerators, bathing tubs, washers, skis, and floating elements of all types.

The invention is further illustrated by the following examples without being restricted thereto.

Example 1

100 parts of an ester with the hydroxyl number 90 and acid number 7, prepared from 1 mol of adipic acid, 1 mol of maleic acid anhydride and 2 mols of glycol by thermal condensation at 150–220° C., are stirred with 0.21 part of quinhydrone and then mixed with 25 parts of toluylene diisocyanate at 100° C. The mixture is then stirred for 30 minutes at 120° C. the temperature allowed to drop to 100° C. and then 85 parts of styrene are added.

6 parts of 3,3'-dichloro-4,4'-diamino diphenyl methane, dissolved in 5 parts of styrene, and 2 parts of cumol peroxide, are added to 100 parts of this solution. The copolymerization and polyaddition is initially carried out at 90° C. After solidifying, the product is heated for a further 3 hours at 120° C.

Values of the test plate:
Impact bending strength _____ kg./cm.$^2$__ 31.2
Bending strength _____ kg./cm.$^2$__ 1430
Brinell hardness—
   10″ _____ 1288
   60″ _____ 1214
Degree Martens_____ 65

Example 2

100 parts of the polyester according to Example 1 and 0.2 part of quinhydrone are mixed by stirring at 100° C. with 29 parts of toluylene diisocyanate and maintained at a temperature of 120° C. for 30 minutes. After cooling to 100° C., 87 parts of styrene are added. 6.6 parts of an addition product of 2 mols of ethylene oxide with 1 mol of 3,3'-dichlorobenzidine and 2 parts of cumol peroxide are introduced into 100 parts of this mixture. Copolymerization and polyaddition takes place at 90° C. The product is thereafter heated for a further 3 hours at 120° C.

The mechanical properties are as follows:

Impact bending strength _____ kg./cm.$^2$__ 50.4
Bending strength _____ kg./cm.$^2$__ 1230
Brinell hardness—
   10″ _____ 1230
   60″ _____ 1220
Degree Martens_____ 62

Example 3

500 parts of a polyester with the hydroxyl number 235 and acid number 10, prepared from 1 mol of adipic acid, 1 mol of maleic acid anhydride and glycol by thermal condensation at 150–220° C. are mixed with 1.4 parts of quinhydrone and 372.5 parts of toluylene diisocyanate at 50° C. The temperature is caused to rise slowly to 120° C. and this temperature is maintained for 30 minutes. 560 parts of styrene are added after the temperature has dropped to 100° C.

13 parts of the addition product obtained from 2 mols of ethylene oxide and 1 mol 3,3'-dichlorobenzidine by introducing the former into the latter at 170–180° C., and 2 mols of cumol peroxide, are mixed by stirring at 50° C., with 100 parts of the aforementioned solution. Copolymerization is carried out at 90° C. The shaped element is thereafter heated for a further 3 hours at 120° C. and has the following mechanical properties:

Impact bending strength _____ kg./cm.$^2$__ 25.7
Bending strength _____ kg./cm.$^2$__ 1420
Brinell hardness—
   10″ _____ 1450
   60″ _____ 1390
Degree Martens_____ 65

Example 4

100 parts of a polyester with the OH number 150 and acid number 2, prepared from 1 mol adipic acid, 2 mols of maleic acid anhydride and 3 mols glycol by thermal condensation at 150–220° C. are mixed at 80° C. with 56.6 parts of toluylene diisocyanate and 1.225 parts of quinhydrone. When the temperature reaches 120° C., this temperature is maintained for 30 minutes and then 79 parts of styrene are mixed therewith by stirring. A solution is prepared which consists of 80 parts of the addition product of 2 mols of ethylene oxide and 1 mol of 3,3'-dichloro-4,4'-diamino diphenyl methane, obtained by introducing the former into the latter at 170–180° C., and 20 parts of methyl methacrylate. 13.5 parts of this solution are introduced into the initially prepared solution and, after adding 2 parts of cumol peroxide, polymerization is initially carried out at 90° C. The product is thereafter heated for a further 3 hours at 120° C.

Example 5

100 parts of the ester according to Example 4, but having a hydroxy number of 190 and an acid number of 6, are mixed by stirring at 80° C. with 0.25 part of quinhydrone and 59 parts of toluylene diisocyanate. After the temperature has risen to 120° C. stirring is continued for another hour and then 85 parts of styrene are added. 2 parts of cumol peroxide and 15.5 parts of the polyamino alcohol-methacrylic acid solution referred to in Example 4 are then added to 100 parts of the said mixture, which is then heated to 90° C. When polymerization has started, the temperature is maintained for 3 hours at 120° C. The copolymer is crystal clear.

Example 6

438 parts of adipic acid, 588 parts of maleic acid anhydride and 850 parts of glycol are condensed in vacuo at an internal temperature of 200° C. A light yellow unsaturated polyester is produced having the acid number 0 and the hydroxyl number 305.

400 parts of this polyester are mixed at room temperature with 1.2 parts of quinhydrone and 380 parts of 1,2,4-toluylene diisocyanate, addition taking place with a gradual increase in temperature. It is necessary to ensure by thorough stirring that the temperature does not exceed 135° C. The mixture is stirred for another half hour at 120–130° C. and then 420 parts of styrene are added.

19 parts of a solution of 80 parts of N,N'-dihydroxy ethyl-3,3'-dichloro-4,4'-diamino diphenyl methane

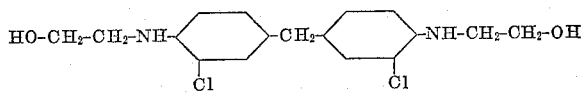

in 20 parts of methyl methacrylate, and 1 part of cumol peroxide are added to 100 parts of the cooled solution. Degasification takes place in vacuo at room temperature and the mixture is thereafter heated to 100° C. Polyaddition and polymerization start almost simultaneously after about 10 minutes. The temperature is finally maintained for a further 2 hours at 130° C. A test piece of this resin has the following properties:

| | |
|---|---|
| Bending strength_____kg./cm.² | 2000 |
| Impact bending strength_____kg./cm.² | 40 |
| ° Martens _____ | 82 |
| Bending strength after storage in water at 80° C.— | |
| After soaking for 1 day_____kg./cm.² | 1900 |
| After soaking for 3 days_____kg./cm.² | 1700 |
| After soaking for 10 days_____kg./cm.² | 1500 |
| After soaking for 30 days_____kg./cm.² | 1500 |

*Example 7*

400 parts of unsaturated polyester, prepared from 1 mol of adipic acid, 2 mols of maleic acid anhydride and 4 mols of glycol by thermal condensation at 150–220° C. and having a hydroxyl number of 305, are mixed with 1.2 parts of quinhydrone and 367 parts of hexamethylene diisocyanate at room temperature. A gradual increase in temperature takes place while stirring. When a temperature of 120° C. is reached, the mixture is maintained at this temperature for a further 30 minutes. A mixture of 220 parts of styrene and 200 parts of phthalic acid diallyl ester are incorporated and the mixture is allowed to cool.

14.5 parts of

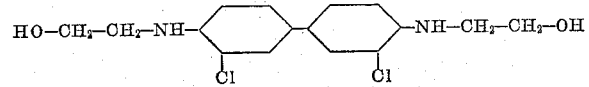

(N,N'-dihydroxy ethyl-3,3'-dichlorobenzidine), obtained by introducing 2 mols of ethylene oxide into 1 mol of dichlorobenzidine at 160–180° C., are mixed by stirring with 100 parts of the aforementioned solution, 2 parts of cumol peroxide are added and the mixture degasified by applying a weak vacuum. Polymerization and polyaddition takes place at 110° C. Solidification occurs after 10 minutes with strong heat of reaction. An improvement in the mechanical properties may be obtained by subsequent heating at 120° C.

"Degree Martens," as used herein, is obtained by following the method described in a book published by Nietsche entitled "Prüfung und Bewertung elektrotechnischer Isolierstoffe," published in 1940, Springer-Verlag, pages 234–237.

The above description and examples are intended to be illustrative only. Any modification or variation therefrom which conforms to the spirit of the invention is intended to be included within the scope of the claims.

What is claimed is:

1. A method for making polymers which comprises reacting an isocyanate-modified unsaturated polyester having terminal —NCO groups, from about 10 percent to about 50 percent of a polymerizable ethylenically unsaturated monomer based on the weight of said polyester and a member selected from the group consisting of an aromatic polyamine and a polyamino alcohol having at least one hydrogen atom on each nitrogen atom; said isocyanate-modified polyester having been prepared by reacting an excess organic polyisocyanate with a polyester prepared by condensation of a dicarboxylic acid including an ethylenically unsaturated dicarboxylic acid and a polyhydric alcohol and having an average molecular weight of from about 250 to about 5,000, an hydroxyl number of from about 80 to about 450 and an acid number of from zero to about 40; said polyamino alcohol having been prepared by reaction of ethylene oxide and an aromatic polyamine.

2. The process of claim 1 wherein said polyester is prepared by condensation of adipic acid, maleic acid anhydride and a glycol.

3. The process of claim 1 wherein said ethylenically unsaturated monomer is styrene.

4. The process of claim 1 wherein said reaction of said isocyanate-modified unsaturated polyester, polymerizable ethylenically unsaturated monomer and member selected from the group consisting of an aromatic polyamine and a polyamino alcohol having at least one hydrogen atom on each nitrogen atom is carried out in the presence of an organic peroxide catalyst.

5. As a new composition of matter, a polymer prepared by reacting an isocyanate-modified unsaturated polyester having terminal —NCO groups, from about 10 percent to about 50 percent of a polymerizable ethylenically unsaturated monomer based on the weight of said polyester and a member selected from the group consisting of an aromatic polyamine and a polyamino alcohol having at least one hydrogen atom on each nitrogen atom; said isocyanate-modified polyester having been prepared by reacting an excess organic polyisocyanate with a polyester prepared by condensation of a dicarboxylic acid including an ethylenically unsaturated dicarboxylic acid and a polyhydric alcohol and having an average molecular weight of from about 250 to about 5,000, a hydroxyl number of from about 80 to about 450 and an acid number of from zero to about 40; said polyamino alcohol having been prepared by reaction of ethylene oxide and an aromatic polyamine.

References Cited in the file of this patent

UNITED STATES PATENTS

| | | |
|---|---|---|
| 2,553,325 | Loritsch | May 15, 1951 |
| 2,621,166 | Schmidt et al. | Dec. 9, 1952 |
| 2,625,535 | Mastin et al. | Jan. 13, 1953 |
| 2,740,743 | Pace | Apr. 3, 1956 |
| 2,780,613 | Rubens | Feb. 5, 1957 |